United States Patent
Sun

(10) Patent No.: US 11,719,583 B2
(45) Date of Patent: Aug. 8, 2023

(54) TEMPERATURE CONTROL

(71) Applicant: BEIJING XIAOMI MOBILE SOFTWARE CO., LTD., Beijing (CN)

(72) Inventor: Changyu Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 432 days.

(21) Appl. No.: 16/942,700

(22) Filed: Jul. 29, 2020

(65) Prior Publication Data

US 2021/0247244 A1 Aug. 12, 2021

(30) Foreign Application Priority Data

Feb. 11, 2020 (CN) .......................... 202010087777.1

(51) Int. Cl.
G01K 7/00 (2006.01)
G01K 7/42 (2006.01)
G01K 13/10 (2006.01)

(52) U.S. Cl.
CPC ............ *G01K 7/425* (2013.01); *G01K 13/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,652,502 A | * | 7/1997 | van Phuoc | H01M 6/5011 |
| | | | | 324/427 |
| 9,423,146 B2 | * | 8/2016 | Bruce | G05D 22/02 |
| 9,430,021 B2 | * | 8/2016 | Lu | H04L 12/66 |
| 10,142,122 B1 | * | 11/2018 | Hill | H04L 12/2807 |
| 2013/0033233 A1 | * | 2/2013 | Noda | H02J 7/0036 |
| | | | | 320/135 |
| 2014/0266071 A1 | | 9/2014 | Tomiyasu et al. | |
| 2016/0359345 A1 | * | 12/2016 | Uesugi | H02J 7/00308 |
| 2020/0150185 A1 | * | 5/2020 | Ramezan Pour Safaei | |
| | | | | H01M 10/48 |

FOREIGN PATENT DOCUMENTS

| | | | | |
|---|---|---|---|---|
| CN | 204857809 U | 12/2015 | | |
| EP | 2003762 A2 | 12/2008 | | |
| EP | 3393003 A1 | * 10/2018 | .......... H01M 10/425 |
| JP | H0837035 A | 2/1996 | | |
| WO | WO-2017188577 A1 | * 11/2017 | ............... G01K 1/02 |
| WO | 2018228559 A1 | 12/2018 | | |

OTHER PUBLICATIONS

Extended European Search Report issued in European Application No. 20191366.2, dated Feb. 4, 2021, (6p).

* cited by examiner

*Primary Examiner* — Lisa M Caputo
*Assistant Examiner* — Nasir U. Ahmed
(74) *Attorney, Agent, or Firm* — Arch & Lake LLP

(57) ABSTRACT

Methods, non-transitory computer-readable storage mediums and electronic devices are provided for controlling temperature. A terminal obtains a target environment temperature value of an environment where the terminal is located. When the terminal is being charged, the terminal determines a target temperature control strategy according to the target environment temperature value. The terminal controls a temperature of the terminal according to the target temperature control strategy.

14 Claims, 6 Drawing Sheets

TEMPERATURE CONTROL

CROSS-REFERENCE TO RELATED APPLICATION

This application is based upon and claims the priority of Chinese patent application No. 202010087777.1 filed on Feb. 11, 2020, the entire contents of which are incorporated herein by reference in its entirety for all purposes.

TECHNICAL FIELD

The present disclosure relates to the field of temperature control, and more particularly to a method, storage medium, and electronic device for controlling temperature.

BACKGROUND

With the improvement in the charging power of a smart terminal, fast charging will cause the terminal to overheat. There is a need to control the temperature of the terminal. At present, the temperature of the terminal is controlled on the basis of a fixed environment temperature.

SUMMARY

In view of this, the present disclosure provides a method and, a storage medium, and an electronic device for controlling temperature.

According to a first aspect of the present disclosure, there is provided a method of controlling temperature. The method is applied to a terminal, and may include obtaining a target environment temperature value of an environment where the terminal is located. The method may also include determining, when charging the terminal, a target temperature control strategy according to the target environment temperature value. The method may further include controlling a temperature of the terminal according to the target temperature control strategy.

According to a second aspect of the present disclosure, a non-transitory computer-readable storage medium having stored therein instructions is provided. When the instructions are executed by one or more processors of an electronic device, the instructions may cause the electronic device to perform obtaining a target environment temperature value of an environment where a terminal is located. The instructions may further cause the electronic device to perform determining, when charging the terminal, a target temperature control strategy according to the target environment temperature value. The instructions may additionally cause the electronic device to perform controlling a temperature of the terminal according to the target temperature control strategy.

According to a third aspect of the present disclosure, an electronic device for controlling temperature is provided. The electronic device may include one or more processors, a non-transitory computer-readable memory storing instructions executable by the one or more processors. Where the one or more processors, when executing the instructions, may be configured to obtain a target environment temperature value of an environment where a terminal is located. The one or more processors may further be configured to determine, when charging the terminal, a target temperature control strategy according to the target environment temperature value. The one or more processors may additionally be configured to control a temperature of the terminal according to the target temperature control strategy.

It should be understood that the above general description and the following detailed description are only examples and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be made in detail to example embodiments, examples of which are illustrated in the accompanying drawings. When the following descriptions involve drawings, like numerals in different drawings, the drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a," "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining."

Figure 1:
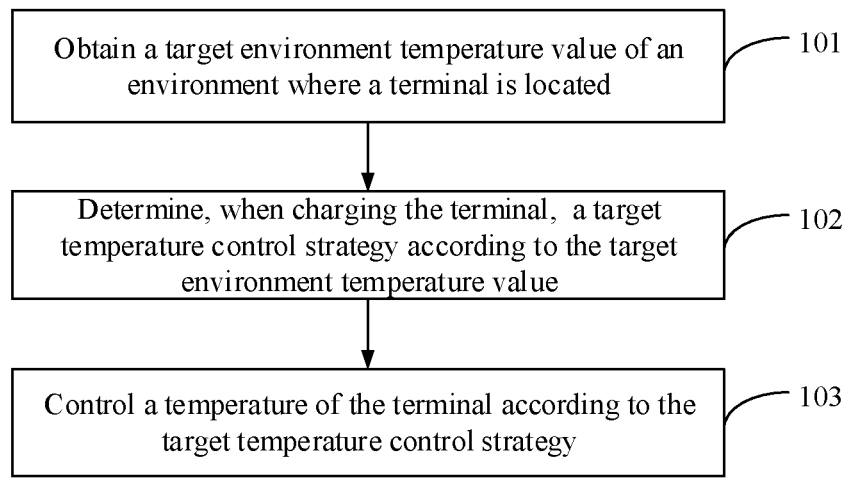
FIG. 1 is a flowchart illustrating a method of controlling temperature, according to an example of the present disclosure.

The method of controlling temperature provided by the examples of the present disclosure may be applied to a terminal such as a smartphone, a tablet computer, and a Personal Digital Assistant (PDA). As shown in FIG. 1, which is a flowchart illustrating a method of controlling temperature according to an example of the present disclosure, steps 101-103 are included.

At step 101, a target environment temperature value of an environment where the terminal is located is obtained. The target environment temperature value, may be, for example, the temperature of the terminal's surrounding environment. For example, the terminal may be in an office and the target environment temperature value may be the temperature of the office. In another example, the terminal may be in a desk drawer in the office, and the target environment temperature value may be the temperature inside the desk drawer.

In the examples of the present disclosure, the target environment temperature value of the environment where the terminal is located may be obtained through a temperature sensor pre-installed on the terminal. Optionally, the target environment temperature value may be obtained periodically.

For example, at time t1, the terminal is located outdoors, and the target environment temperature value obtained at t1 is 10 degrees. At time t2, the terminal is brought indoors, and the target environment temperature value increases, for example, the target environment temperature value at t2 is 20 degrees. Now, if the target environment temperature value of 10 degrees is still used, a temperature control strategy for 10 degrees may not be suitable for a temperature control strategy for 20 degrees, affecting the accuracy of controlling the temperature of the terminal.

In the examples of the present disclosure, periodically obtaining the target environment temperature value may effectively ensure the accuracy of the obtained target environment temperature value when the environment where the terminal is located changes, and facilitate the subsequent accurate control over the temperature of the terminal.

At step 102, when charging the terminal, a target temperature control strategy is determined according to the target environment temperature value. Charging the terminal, for example, may include electrically charging through a wire or wirelessly. In another example, charging the terminal may also include the terminal communicating, through wire or wirelessly, to a separate device.

In the examples of the present disclosure, when charging different types of terminals, in a case of the same target environment temperature value, target temperature control strategies corresponding to different terminals may be the same or different, which is not limited in the present disclosure.

For example, when all target environment temperature values are d, a target temperature control strategy corresponding to terminal 1 may be strategy 1, and a target temperature control strategy corresponding to terminal 2 may be strategy 2. Strategy 1 and strategy 2 may be the same or different.

At step 103, a temperature of the terminal is controlled according to the target temperature control strategy. The temperature of the terminal, for example, may be the surface temperature of the terminal or the inner body temperature of the terminal.

The target temperature control strategy may include a target temperature control triggering condition and a target temperature control releasing condition. The target temperature control triggering condition may indicate a temperature value at which the control over the temperature of the terminal is triggered. The target temperature control releasing condition may indicate a temperature value at which the control over the temperature of the terminal is no longer performed. The temperature corresponding to the target temperature control triggering condition is higher than the temperature corresponding to the target temperature control releasing condition.

According to the target temperature control strategy, when charging the terminal, a charging current value for charging the terminal may be flexibly controlled, so that the temperature of the terminal may be controlled. The temperature of the terminal may refer to a temperature of the housing surface of the terminal.

In the above example, the target environment temperature value of the environment where the terminal is located may be obtained first, and when charging the terminal, the target temperature control strategy is determined according to the target environment temperature value, so that the temperature of the terminal is controlled during the charging of the terminal. The target temperature control strategy is determined according to the target environment temperature value of the environment where the terminal is located, and then the charging current value for charging the terminal is flexibly controlled according to the target temperature control strategy to avoid the overheating of the terminal caused by rapid charging and achieve the purpose of controlling the temperature of the terminal, so that the controlling of the temperature of the terminal is more flexible and usable. When charging the terminal, controlling the temperature of the terminal includes, but is not limited to, controlling the charging current value for charging the terminal, and may further include other methods of controlling temperature, for example, closing high energy-consuming background applications, which is not limited in the present disclosure.

Figure 2:
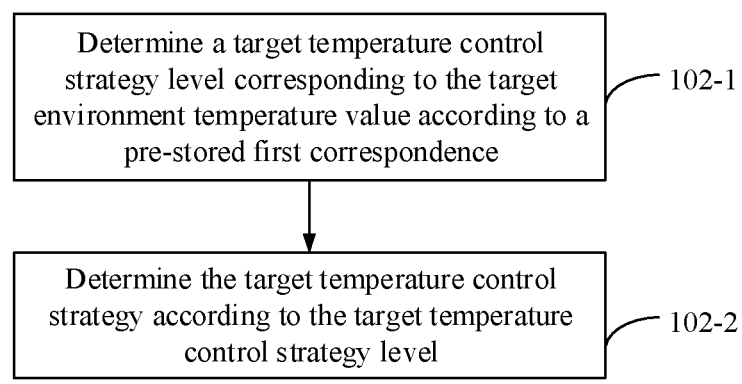
FIG. 2 is a flowchart illustrating another method of controlling temperature, according to an example of the present disclosure.

In some examples, as shown in FIG. 2, which is a flowchart illustrating another method of controlling the temperature on the basis of the example shown in FIG. 1, step 102 further includes steps 102-1 and 102-2.

At step 102-1, a target temperature control strategy level corresponding to the target environment temperature value is determined according to a pre-stored first correspondence.

In the examples of the present disclosure, the first correspondence includes a plurality of environment temperature values, and temperature control strategy levels corresponding thereto one to one, which are, as shown in table 1, arranged in ascending order of the environment temperature values.

TABLE 1

| Environment temperature values | Temperature control strategy levels |
| --- | --- |
| $d_1$ | $n_1$ |
| $d_2$ | $n_2$ |
| $d_3$ | $n_3$ |
| ... | ... |

The terminal has pre-stored therein the first correspondence. Optionally, the temperature control strategy level may be lower as the environment temperature value is higher. For example, $d_1<d_2<d_3$, $n_1>n_2>n_3$.

After the target environment temperature value of the environment where the terminal is currently located is obtained, when the terminal is to be charged, the target temperature control strategy level corresponding to the target environment temperature value may be determined according to the first correspondence.

At step 102-2, the target temperature control strategy is determined according to the target temperature control strategy level.

After the target temperature control strategy level is determined, the target temperature control triggering condition and the target temperature control releasing condition, which are included in the target temperature control strategy corresponding to the target temperature control strategy level, may be determined.

In the above example, the target temperature control strategy level corresponding to the target environment temperature value of the environment where the terminal is located may be determined according to the pre-stored first correspondence, so that the target temperature control strategy corresponding to the target temperature control strategy level is further determined, and thereby the temperature of the terminal is controlled. The first correspondence may be used to search the target temperature control strategy level easily and quickly.

Figure 3:
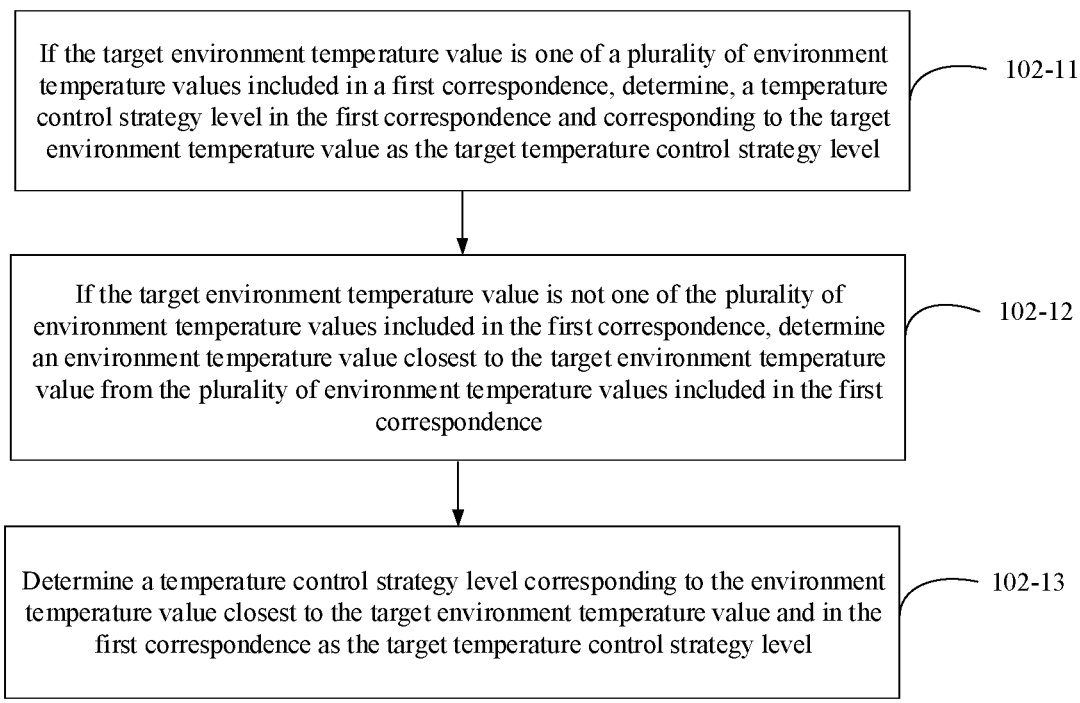
FIG. 3 is a flowchart illustrating yet another method of controlling temperature, according to an example of the present disclosure.

In an alternative example, as shown in FIG. 3, which is a flowchart illustrating yet another method of controlling the temperature on the basis of the example shown in FIG. 2, the step 102-1 further includes steps 102-11 to 102-13.

At steps 102-11, if the target environment temperature value is one of a plurality of environment temperature values included in the first correspondence, a temperature control strategy level in the first correspondence and corresponding to the target environment temperature value is determined or selected as the target temperature control strategy level.

If the target environment temperature value is one of the plurality of environment temperature values included in the first correspondence, the target temperature control strategy level corresponding to the target environment temperature value may be determined directly according to the first correspondence.

For example, if the target environment temperature value is $d_2$, the target temperature control strategy level may be determined to be $n_2$, according to table 1.

At steps 102-12, if the target environment temperature value is not one of the plurality of environment temperature values included in the first correspondence, an environment temperature value closest to the target environment temperature value is determined from the plurality of environment temperature values included in the first correspondence.

If the target environment temperature value is not one of the plurality of environment temperature values included in the first correspondence, an environment temperature value having the minimum absolute value of difference from the target environment temperature value may be determined from the plurality of environment temperature values included in the first correspondence.

For example, if the target environment temperature value is m, and m is not included in table 1, an environment temperature value having a smallest absolute value of difference from the target environment temperature value m may be determined from $d_1$, $d_2$, $d_3$, . . . in table 1. Suppose it is $d_5$.

At steps 102-13, a temperature control strategy level corresponding to the environment temperature value closest to the target environment temperature value and in the first correspondence is determined or selected as the target temperature control strategy level.

For example, if the environment temperature value in the first correspondence having the smallest absolute value of difference from the target environment temperature value m is $d_5$, a temperature control strategy level ns corresponding to $d_5$ may be selected as the target temperature control strategy level.

In the above examples, if the target environment temperature value is one of the plurality of environment temperature values included in the pre-stored first correspondence, a temperature control strategy level in the first correspondence and corresponding to the target environment temperature value may be determined or selected as the target temperature control strategy level. If the target environment temperature value is not one of the plurality of environment temperature values included in the first correspondence, an environment temperature value closest to the target environment temperature value may be determined from the plurality of environment temperature values included in the first correspondence, and the temperature control strategy level corresponding to the determined environment temperature value is determined as the target temperature control strategy level. In this way, the corresponding target temperature control strategy level may be determined quickly according to the target environment temperature value of the environment where the terminal is located, and the target temperature control strategy is determined according to the target temperature control strategy level. The charging current value for charging the terminal is flexibly controlled through the target temperature control strategy, which facilitates the subsequent control over the temperature of the terminal, and has high usability.

In some examples, the step 102-2 may include: determining a target temperature control triggering condition and a target temperature control releasing condition corresponding to the target temperature control strategy level according to a pre-stored second correspondence.

The second correspondence includes temperature control strategy levels, and temperature control triggering conditions and temperature control releasing conditions corresponding thereto one to one, as shown in table 2.

TABLE 2

| Environment temperature values | Temperature control strategy levels | Temperature control triggering conditions | Temperature control releasing conditions |
|---|---|---|---|
| $d_1$ | $n_1$ | $B_1$ | $C_1$ |
| $d_2$ | $n_2$ | $B_2$ | $C_2$ |
| $d_3$ | $n_3$ | $B_3$ | $C_3$ |
| . . . | . . . | . . . | . . . |

In the examples of the present disclosure, if environment temperature values corresponding to one or more temperature control strategy levels are less than or equal to a preset temperature value, temperature values of temperature control triggering conditions corresponding to the one or more temperature control strategy levels may be same. Similarly, temperature values of temperature control releasing conditions corresponding to the one or more temperature control strategy levels may be the same. If the environment temperature value is greater than the preset temperature value, the temperature values of the temperature control triggering conditions, and the temperature control releasing condition may be increased. The preset temperature value may be 38 degrees or any value greater than 38 degrees. Table 2 may be adaptively adjusted to table 3.

TABLE 3

| Environment temperature values | Temperature control strategy levels | Temperature control triggering conditions | Temperature control releasing conditions |
|---|---|---|---|
| $d_1$ | $n_1$ | $B_1$ | $C_1$ |
| $d_2$ | $n_2$ | $B_1$ | $C_1$ |
| $d_3$ | $n_3$ | $B_1$ | $C_1$ |
| ... | ... | ... | ... |
| Preset temperature value ($d_L$) | $n_L$ | $B_1$ | $C_1$ |
| $d_{L+1}$ | $n_{L+1}$ | $b_2$ | $C_2$ |
| $d_{L+2}$ | $n_{L+2}$ | $b_2$ | $C_2$ |
| $d_{L+3}$ | $n_{L+3}$ | $b_3$ | $C_3$ |
| ... | ... | ... | ... |

In the table 3, $B_1<B_2<B_3$, $C_1<C_2<C_3$, $B_1>C_1$, $B_2>C_2$, and $B_3>C_3$.

The terminal has pre-stored the second correspondence, and the target temperature control triggering condition and the target temperature control releasing condition corresponding to the target temperature control strategy level may be determined according to the second correspondence and the target environment temperature detected by the terminal.

In the above examples, the target temperature control triggering condition and the target temperature control releasing condition corresponding to the target temperature control strategy level may be determined according to the pre-stored second correspondence and the target environment temperature detected by the terminal, so that the temperature of the terminal is controlled subsequently according to the target temperature control triggering condition and the target temperature control releasing condition. The second correspondence may be used to search the target temperature control triggering condition and the target temperature control releasing condition easily and quickly.

In some examples, in the first correspondence and the second correspondence, the smaller the difference between two adjacent environment temperature values is, the more accurate the target temperature control strategy finally determined is.

In some examples, step 103 may include the following steps:

when a temperature of a housing surface of the terminal reaches a temperature value corresponding to the target temperature control triggering condition, a charging current value for charging the terminal is reduced until the temperature of housing surface of the terminal is less than or equal to a temperature value corresponding to the target temperature control releasing condition.

During the charging of the terminal, the temperature of housing surface of the terminal rises continuously. When the temperature of the housing surface of the terminal reaches the temperature value corresponding to the target temperature control triggering condition, the control over the temperature of the terminal is triggered. For example, the charging current value for charging the terminal may be reduced until the temperature of the housing surface of the terminal is less than or equal to the temperature value corresponding to the target temperature control releasing condition. In this case, the control over the temperature of the terminal is released. For example, the charging current value may be increased again.

In the above example, when the temperature of the terminal is controlled during the charging of the terminal, when the temperature of housing surface of the terminal reaches the temperature value corresponding to the target temperature control triggering condition, the charging current value for charging the terminal is reduced until the temperature of housing surface of the terminal is less than or equal to the temperature value corresponding to the target temperature control releasing condition. The purpose of controlling the temperature of the terminal according to environments with different temperatures where the terminal is located is achieved, so that the controlling of the temperature of the terminal is more flexible and usable.

Figure 4:
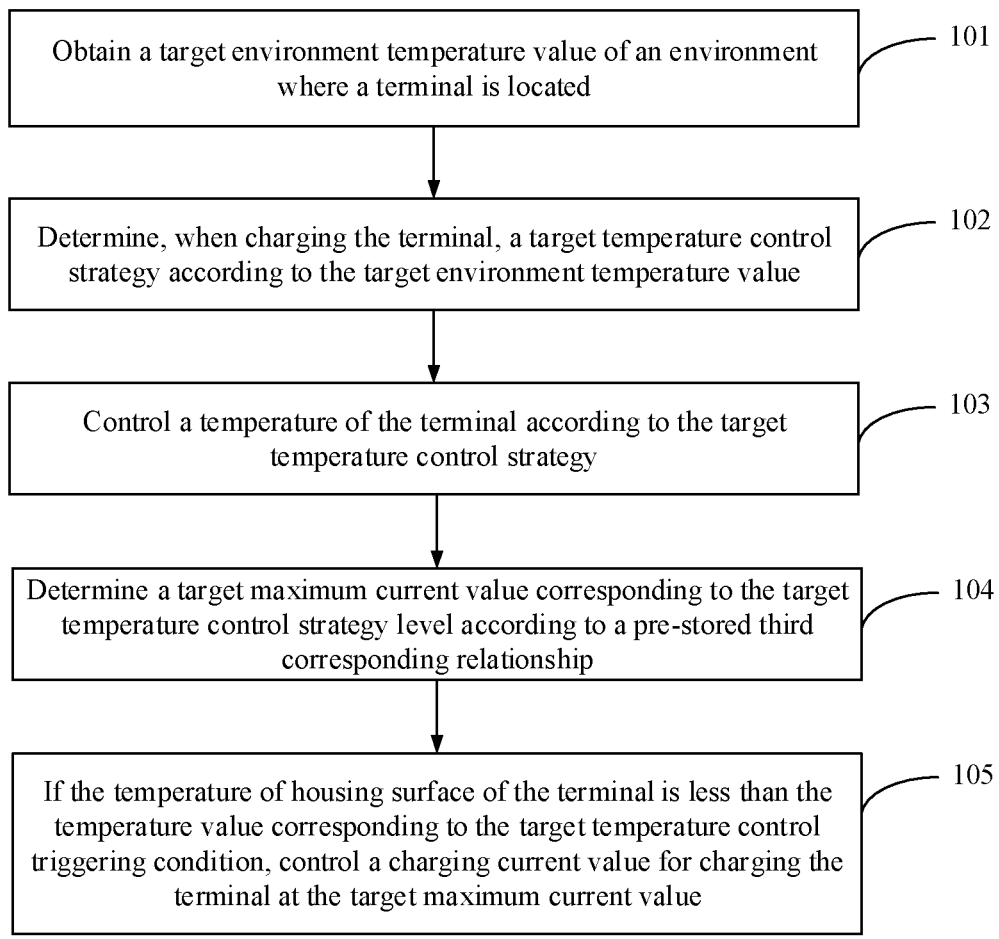
FIG. 4 is a flowchart illustrating still another method of controlling temperature, according to an example of the present disclosure.

In some examples, as shown in FIG. 4, which is a flowchart illustrating still another method of controlling temperature according to an example of the present disclosure, steps 101-105 are included.

For the steps 101-103, reference may be made to the example shown in FIG. 1, which will not be repeated here. At step 104, a target maximum current value corresponding to the target temperature control strategy level is determined according to a pre-stored third correspondence.

The third correspondence includes temperature control strategy levels, and maximum current values corresponding thereto one to one, as shown in table 4.

TABLE 4

| Environment temperature values | Temperature control strategy levels | Maximum current values |
|---|---|---|
| $d_1$ | $n_1$ | $A_1$ |
| $d_2$ | $n_2$ | $A_2$ |
| $d_3$ | $n_3$ | $A_3$ |
| ... | ... | ... |

In table 4, the lower the temperature control strategy level is, the lower the maximum current value is. For example, $d_1<d_2<d_3$, $n_1>n_2>n_3$, $A_1>A_2>A_3$.

As can be known from the table 4, the higher the environment temperature value is, the lower the maximum current value is.

At step 105, if the temperature of the housing surface of the terminal is less than the temperature value corresponding to the target temperature control triggering condition, a charging current value for charging the terminal is controlled at the target maximum current value.

In this step, if the control over the temperature of the terminal is not triggered, the charging current value for charging the terminal may be controlled at the target maximum current value.

When the environment temperature value is lower, the terminal may use a higher charging current value to achieve the purpose of fast charging. When the environment temperature value is higher, the terminal uses a lower charging current value for charging to avoid the temperature of the terminal from rising too fast. Corresponding to the method examples, the present disclosure further provides apparatus examples.

Figure 5:
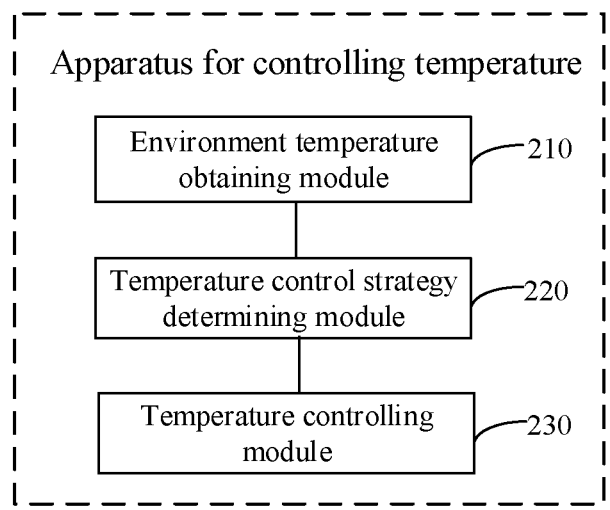
FIG. 5 is a block diagram illustrating an apparatus for controlling temperature, according to an example of the present disclosure.

FIG. 5 is a block diagram illustrating an apparatus for controlling temperature according to an example of the present disclosure. The apparatus is applied to a terminal. The apparatus includes an environment temperature obtaining module 210, a temperature control strategy determining module 220, and a temperature controlling module 230.

The environment temperature obtaining module 210 is configured to obtain a target environment temperature value of an environment where the terminal is located.

The temperature control strategy determining module 220 is configured to, when charging the terminal, determine a target temperature control strategy according to the target environment temperature value.

The temperature controlling module 230 is configured to control a temperature of the terminal according to the target temperature control strategy.

Figure 6:
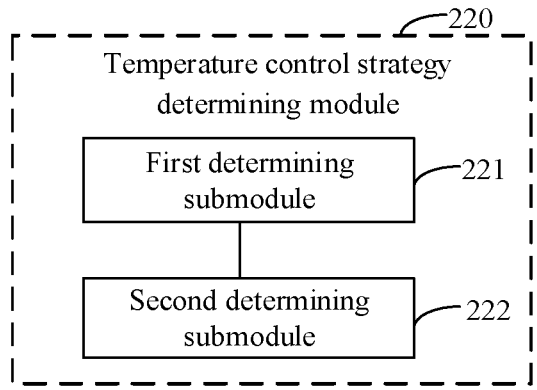
FIG. 6 is a block diagram illustrating another apparatus for controlling temperature, according to an example of the present disclosure.

As shown in FIG. 6, which is a block diagram illustrating another apparatus for controlling temperature according to an example of the present disclosure, on the basis of the example shown in FIG. 5, the temperature control strategy determining module 220 includes a first determining submodule 221 and a second determining submodule 222.

The first determining submodule 221 is configured to determine a target temperature control strategy level corresponding to the target environment temperature value according to a pre-stored first correspondence, where the first correspondence includes a plurality of environment temperature values, and temperature control strategy levels corresponding thereto one to one.

The second determining submodule 222 is configured to determine the target temperature control strategy according to the target temperature control strategy level.

Figure 7:
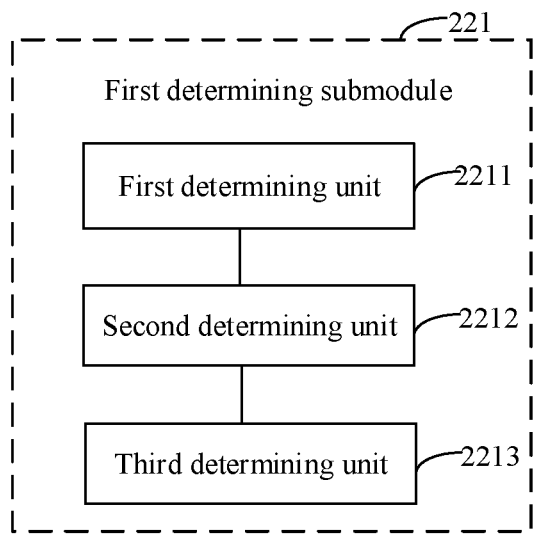
FIG. 7 is a block diagram illustrating yet another apparatus for controlling temperature, according to an example of the present disclosure.

As shown in FIG. 7, which is a block diagram illustrating yet another apparatus for controlling temperature according to an example of the present disclosure, on the basis of the example shown in FIG. 6, the first determining submodule 221 includes a first determining unit 2211, a second determining unit 2212, and a third determining unit 2213.

The first determining unit 2211 is configured to, if the target environment temperature value is one of the plurality of environment temperature values included in the first correspondence, determine or select, a temperature control strategy level in the first correspondence and corresponding to the target environment temperature value as the target temperature control strategy level.

The second determining unit 2212 is configured to, if the target environment temperature value is not one of the plurality of environment temperature values included in the first correspondence, determine, an environment temperature value closest to the target environment temperature value from the plurality of environment temperature values included in the first correspondence.

The third determining unit 2213 is configured to determine or select, a temperature control strategy level corresponding to the environment temperature value in the first correspondence closest to the target environment temperature value, as the target temperature control strategy level.

Figure 8:
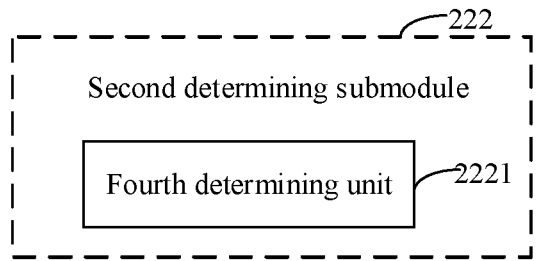
FIG. 8 is a block diagram illustrating still another apparatus for controlling temperature, according to an example of the present disclosure.

As shown in FIG. 8, which is a block diagram illustrating still another apparatus for controlling temperature according to an example of the present disclosure, on the basis of the example shown in FIG. 6, the second determining submodule 222 includes a fourth determining unit 2221.

The fourth determining unit 2221 is configured to determine a target temperature control triggering condition and a target temperature control releasing condition corresponding to the target temperature control strategy level according to a pre-stored second correspondence, where the second correspondence includes temperature control strategy levels, and temperature control triggering conditions and temperature control releasing conditions corresponding thereto one to one.

Figure 9:
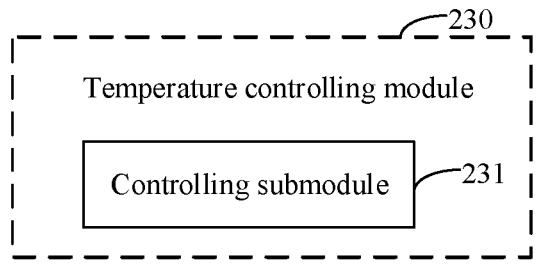
FIG. 9 is a block diagram illustrating another apparatus for controlling temperature, according to an example of the present disclosure.

As shown in FIG. 9, which is a block diagram illustrating another apparatus for controlling temperature according to an example of the present disclosure, on the basis of the example shown in FIG. 8, the temperature controlling module 230 includes a controlling submodule 231.

The controlling submodule 231 is configured to, when a temperature of a housing surface of the terminal reaches a temperature value corresponding to the target temperature control triggering condition, reduce a charging current value for charging the terminal until the temperature of the housing surface of the terminal is less than or equal to a temperature value corresponding to the target temperature control releasing condition.

Figure 10:
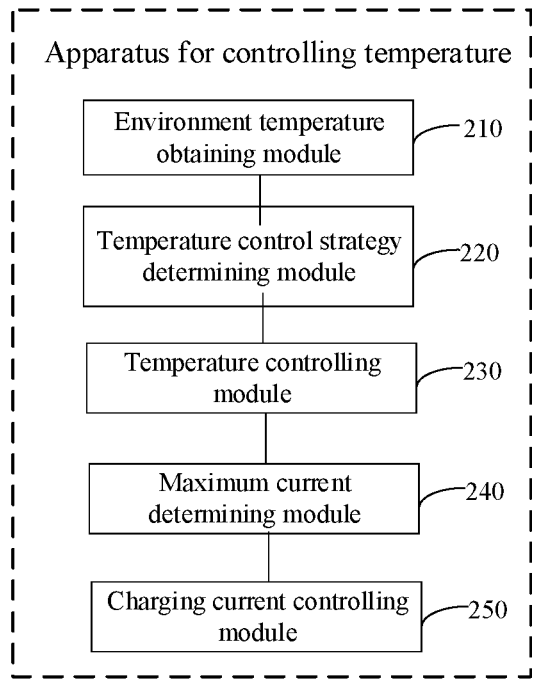
FIG. 10 is a block diagram illustrating yet another apparatus for controlling temperature, according to an example of the present disclosure.

As shown in FIG. 10, which is a block diagram illustrating another apparatus for controlling temperature according to an example of the present disclosure, the apparatus includes an environment temperature obtaining module 210, a temperature control strategy determining module 220, a temperature controlling module 230, a maximum current determining module 240, and a charging current controlling module 250.

For the environment temperature obtaining module 210, the temperature control strategy determining module 220, and the temperature controlling module 230, reference may be made to the description of the above examples, which will not be repeated here.

The maximum current determining module 240 is configured to determine a target maximum current value corresponding to the target temperature control strategy level according to a pre-stored third correspondence, where the third correspondence includes temperature control strategy levels, and maximum current values corresponding thereto one to one.

The charging current controlling module 250 is configured to, if the temperature of the housing surface of the terminal is less than the temperature value corresponding to the target temperature control triggering condition, control a charging current value for charging the terminal as the target maximum current value.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

Correspondingly, the present disclosure further provides a computer-readable storage medium having a computer program stored thereon, where the computer program is configured to implement any of the methods of controlling temperature as described above.

Correspondingly, the present disclosure further provides an electronic device, including: a processor; and a memory for storing processor-executable instructions, where the processor, when executing the executable instructions, is configured to: obtain a target environment temperature value of an environment where the terminal is located; when charging the terminal, determine a target temperature control strategy according to the target environment temperature value; and control a temperature of the terminal according to the target temperature control strategy.

Figure 11:
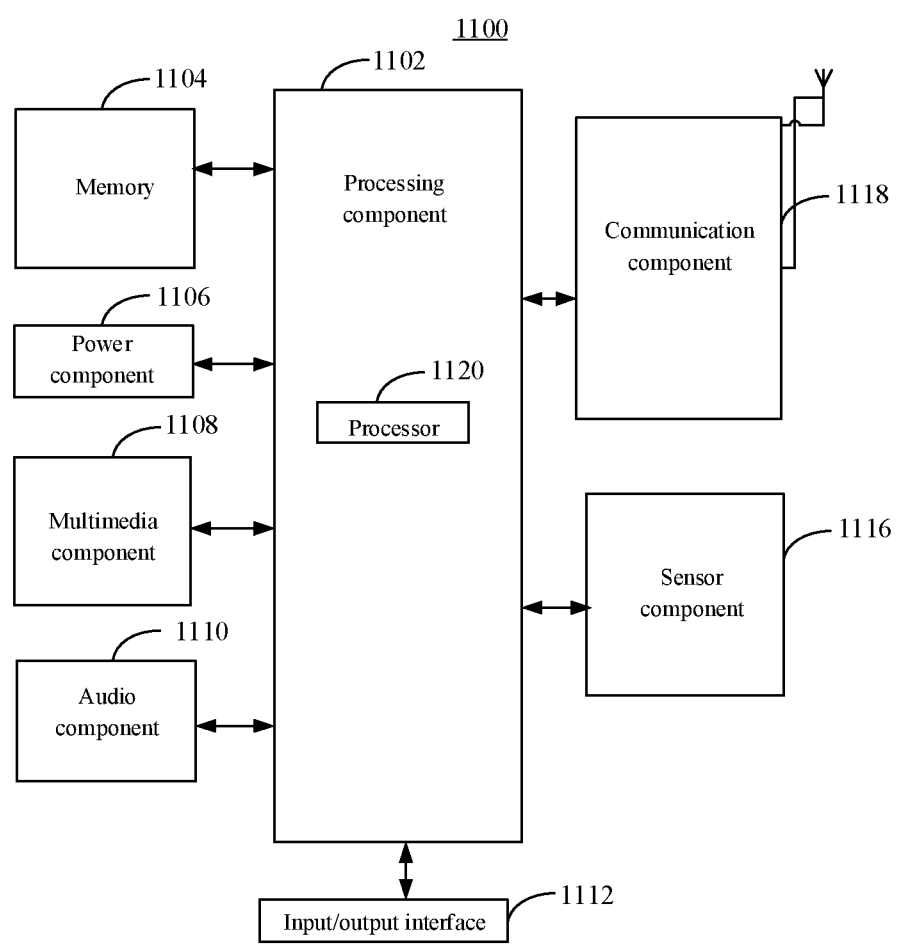
FIG. 11 is a schematic structural diagram illustrating an electronic device, according to an example of the present disclosure.

FIG. 11 is a schematic structural diagram illustrating an electronic device 1100 according to an example of the present disclosure. For example, the electronic device 1100 may be a mobile phone, a tablet computer, an e-book reader, a multimedia player, a wearable device, a vehicle-mounted terminal, or other terminal.

Referring to FIG. 11, the electronic device 1100 may include one or more of the following components: a processing component 1102, a memory 1104, a power component 1106, a multimedia component 1108, an audio component 1110, an input/output (I/O) interface 1112, a sensor component 1116, and a communication component 1118.

The processing component 1102 usually controls the overall operation of the electronic device 1100, such as operations associated with display, telephone calls, data communications, camera operations, and recording operations. The processing component 1102 may include one or more processors 1120 to execute instructions to perform all or part of the steps in the methods described above. Moreover, the processing component 1102 may include one or more modules to facilitate interaction between the processing component 1102 and other components. For example, the processing component 1102 may include a multimedia module to facilitate interaction between the multimedia component 1108 and the processing component 1102. For another example, the processing component 1102 may read executable instructions from the memory to perform steps in the method of controlling temperature provided in an example as described above.

The memory 1104 is configured to store various types of data to support operation at the electronic device 1100. Examples of these data include instructions for any application or method operating at the electronic device 1100, contact data, phone book data, messages, pictures, videos, and the like. The memory 1104 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The power component 1106 provides power to various components of the electronic device 1100. The power component 1106 may include a power management system, one or more power sources, and other components associated with power generated, managed, and distributed for the electronic device 1100.

The multimedia component 1108 includes a display screen that provides an output interface between the electronic device 1100 and a user. In some examples, the multimedia component 1108 includes a front camera and/or a rear camera. When the electronic device 1100 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1110 is configured to output and/or input audio signals. For example, the audio component 1110 includes a microphone (MIC) configured to receive an external audio signal when the electronic device 1100 is in an operation mode, such as a call mode, a recording mode, and a voice recognition mode. The received audio signal may be further stored in the memory 1104 or transmitted via the communication component 1118. In some examples, the audio component 1110 also includes a loudspeaker for outputting an audio signal.

The I/O interface 1112 provides an interface between the processing component 1102 and a peripheral interface module, which may be a keyboard, a click wheel, a button, or the like. These buttons may include, but are not limited to, a home button, a volume button, a start button, and a lock button.

The sensor component 1116 includes one or more sensors for providing a status assessment in various aspects to the electronic device 1100. For example, the sensor component 1116 may detect an open/closed state of the electronic device 1100, and the relative positioning of components, for example, the component is a display and a keypad of the electronic device 1100. The sensor component 1116 may also detect a change in position of the electronic device 1100 or a component of the electronic device 1100, the presence or absence of a user in contact with the electronic device 1100, the orientation or acceleration/deceleration of the electronic device 1100 and a change in temperature of the electronic device 1100. The sensor component 1116 may include a proximity sensor configured to detect the presence of nearby objects without any physical contact. The sensor component 1116 may also include an optical sensor, such as a CMOS or CCD image sensor, for use in imaging applications. In some examples, the sensor component 1116 may also include an acceleration sensor, a gyro sensor, a magnetic sensor, a pressure sensor, or a temperature sensor.

The communication component 1118 is configured to facilitate wired or wireless communication between the electronic device 1100 and other devices. The electronic device 1100 may access a wireless network based on a communication standard, such as Wi-Fi, 2G, 3G, 4G or 5G, or a combination thereof. In an example, the communication component 1118 receives broadcast signals or broadcast associated information from an external broadcast management system via a broadcast channel. In an example, the communication component 1118 also includes a near field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology, and other technologies.

In an example, the electronic device 1100 may be implemented by one or more application-specific integrated circuits (ASICs), digital signal processors (DSPs), digital signal processing devices (DSPDs), programmable logic devices (PLDs), a field-programmable gate array (FPGA), a controller, a microcontroller, a microprocessor or other electronic elements for performing the above methods.

In an example embodiment, there is also provided a non-transitory computer-readable storage medium including instructions, such as a memory 1104 including instructions, where the instructions are executable by the processor 1120 of the electronic device 1100 to implement the method of controlling temperature as described above. For example, the non-transitory computer-readable storage medium may be a ROM, a random access memory (RAM), a CD-ROM, a magnetic tape, a floppy disk, and an optical data storage device.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

The above are only examples of the present disclosure, which are not used to limit the present disclosure. Any modification, equivalent replacement, improvement, etc. made within the spirit and principle of the present disclosure should be included within the protection scope of the present disclosure.

The invention claimed is:

1. A temperature control method applied to a terminal, comprising:
    obtaining a target environment temperature value of an environment where the terminal is located; wherein the target environment temperature value is obtained through a temperature sensor pre-installed on the terminal;
    determining, when charging the terminal, a target temperature control strategy according to the target environment temperature value; and
    controlling a temperature of the terminal according to the target temperature control strategy;
    wherein determining the target temperature control strategy according to the target environment temperature value comprises:
        determining a target temperature control strategy level corresponding to the target environment temperature value according to a pre-stored first correspondence, wherein the pre-stored first correspondence comprises a plurality of environment temperature values and temperature control strategy levels, and wherein the plurality of environment temperature values correspond one to one to the temperature control strategy levels; and
        determining a target temperature control triggering condition and a target temperature control releasing condition corresponding to the target temperature control strategy level according to a pre-stored second correspondence, wherein the second correspondence comprises the temperature control strategy levels, temperature control triggering conditions, and temperature control releasing conditions; wherein the temperature control strategy levels, the temperature control triggering conditions, and the temperature control releasing conditions correspond one to one to each other.

2. The temperature control method according to claim 1, wherein determining the target temperature control strategy level corresponding to the target environment temperature value according to the pre-stored first correspondence comprises:
    in response to determining that the target environment temperature value is equal to one of the plurality of environment temperature values, selecting a temperature control strategy level in the pre-stored first correspondence and corresponding to the target environment temperature value as the target temperature control strategy level.

3. The temperature control method according to claim 1, wherein determining the target temperature control strategy level corresponding to the target environment temperature value according to the pre-stored first correspondence comprises:
    in response to determining that the target environment temperature value is not equal to one of the plurality of environment temperature values, obtaining an environment temperature value closest to the target environment temperature value from the plurality of environment temperature values included in the pre-stored first correspondence; and
    selecting a temperature control strategy level corresponding to the environment temperature value closest to the target environment temperature value as the target temperature control strategy level.

4. The temperature control method according to claim 1, wherein controlling the temperature of the terminal according to the target temperature control strategy comprises:
    reducing, when a temperature of a housing surface of the terminal reaches a temperature value corresponding to the target temperature control triggering condition, a first charging current value for charging the terminal until the temperature of the housing surface of the terminal is less than or equal to a temperature value corresponding to the target temperature control releasing condition.

5. The temperature control method according to claim 4, further comprising:
    determining a target maximum current value corresponding to the target temperature control strategy level according to a pre-stored third correspondence, wherein the pre-stored third correspondence comprises temperature control strategy levels and maximum current values, and wherein the temperature control strategy levels correspond one to one to the maximum current values; and
    controlling, in response to determining that the temperature of the housing surface of the terminal is less than the temperature value corresponding to the target temperature control triggering condition, a second charging current value for charging the terminal at the target maximum current value.

6. A non-transitory computer-readable storage medium having a plurality of programs for execution by an electronic device having one or more processors, wherein the plurality of programs, when executed by the one or more processors, cause the electronic device to perform acts comprising:
    obtaining a target environment temperature value of an environment where a terminal is located; wherein the target environment temperature value is obtained through a temperature sensor pre-installed on the terminal;
    determining, when charging the terminal, a target temperature control strategy according to the target environment temperature value; and
    controlling a temperature of the terminal according to the target temperature control strategy;
    wherein determining the target temperature control strategy according to the target environment temperature value comprises:
        determining a target temperature control strategy level corresponding to the target environment temperature value according to a pre-stored first correspondence, wherein the pre-stored first correspondence comprises a plurality of environment temperature values and temperature control strategy levels, and wherein the plurality of environment temperature values correspond one to one to the temperature control strategy levels; and
        determining a target temperature control triggering condition and a target temperature control releasing condition corresponding to the target temperature control strategy level according to a pre-stored second correspondence, wherein the second correspondence comprises the temperature control strategy levels, temperature control triggering conditions, and temperature control releasing conditions; wherein the temperature control strategy levels, the temperature control triggering conditions, and the temperature control releasing conditions correspond one to one to each other.

7. The non-transitory computer-readable storage medium according to claim 6, wherein the plurality of programs further cause the electronic device to perform:

in response to determining that the target environment temperature value is equal to one of the plurality of environment temperature values, selecting a temperature control strategy level in the pre-stored first correspondence and corresponding to the target environment temperature value as the target temperature control strategy level.

8. The non-transitory computer-readable storage medium according to claim 6, wherein the plurality of programs further cause the electronic device to perform:

in response to determining that the target environment temperature value is not equal to one of the plurality of environment temperature values, obtaining an environment temperature value closest to the target environment temperature value from the plurality of environment temperature values included in the pre-stored first correspondence; and selecting a temperature control strategy level corresponding to the environment temperature value closest to the target environment temperature value as the target temperature control strategy level.

9. The non-transitory computer-readable storage medium according to claim 6, wherein the plurality of programs further cause the electronic device to perform:

reducing, when a temperature of a housing surface of the terminal reaches a temperature value corresponding to the target temperature control triggering condition, a first charging current value for charging the terminal until the temperature of the housing surface of the terminal is less than or equal to a temperature value corresponding to the target temperature control releasing condition.

10. The non-transitory computer-readable storage medium according to claim 9, wherein the plurality of programs further cause the electronic device to perform:

determining a target maximum current value corresponding to the target temperature control strategy level according to a pre-stored third correspondence, wherein the pre-stored third correspondence comprises the temperature control strategy levels and maximum current values, and wherein the temperature control strategy levels correspond one to one to the maximum current values; and controlling, in response to determining that the temperature of the housing surface of the terminal is less than the temperature value corresponding to the target temperature control triggering condition, a second charging current value for charging the terminal as the target maximum current value.

11. An electronic device, comprising:
one or more processors; and
a non-transitory computer-readable storage medium storing instructions executable by the one or more processors, wherein the one or more processors, when executing the instructions, are configured to:

obtain a target environment temperature value of an environment where a terminal is located; wherein the target environment temperature value is obtained through a temperature sensor pre-installed on the terminal;

determine, when charging the terminal, a target temperature control strategy according to the target environment temperature value; and control a temperature of the terminal according to the target temperature control strategy;

wherein the one or more processors are further configured to:

determine a target temperature control strategy level corresponding to the target environment temperature value according to a pre-stored first correspondence, wherein the pre-stored first correspondence comprises a plurality of environment temperature values and temperature control strategy levels, and wherein the plurality of environment temperature values correspond one to one to the temperature control strategy levels; and determine a target temperature control triggering condition and a target temperature control releasing condition corresponding to the target temperature control strategy level according to a pre-stored second correspondence, wherein the second correspondence comprises the temperature control strategy levels, temperature control triggering conditions, and temperature control releasing conditions; wherein the temperature control strategy levels, the temperature control triggering conditions, and the temperature control releasing conditions correspond one to one to each other.

12. The electronic device according to claim 11, wherein the one or more processors configured to determine the target temperature control strategy level corresponding to the target environment temperature value according to the pre-stored first correspondence are further configured to:

select, in response to determining that the target environment temperature value is equal to one of the plurality of environment temperature values, a temperature control strategy level in the pre-stored first correspondence and corresponding to the target environment temperature value as the target temperature control strategy level;

obtain, in response to determining that the target environment temperature value is not one of the plurality of environment temperature values, an environment temperature value closest to the target environment temperature value from the plurality of environment temperature values included in the first correspondence; and select a temperature control strategy level corresponding to the environment temperature value closest to the target environment temperature value as the target temperature control strategy level.

13. The electronic device according to claim 11, wherein the one or more processors configured to control the temperature of the terminal according to the target temperature control strategy are further configured to:

reduce, when a temperature of a housing surface of the terminal reaches a temperature value corresponding to the target temperature control triggering condition, a first charging current value for charging the terminal until the temperature of the housing surface of the terminal is less than or equal to a temperature value corresponding to the target temperature control releasing condition.

14. The electronic device according to claim 13, wherein the one or more processors are further configured to:
  determine a target maximum current value corresponding to the target temperature control strategy level according to a pre-stored third correspondence, wherein the pre-stored third correspondence comprises the temperature control strategy levels and maximum current values, and wherein the temperature control strategy levels correspond one to one to the maximum current values;
  control, in response to determining that the temperature of the housing surface of the terminal is less than the temperature value corresponding to the target temperature control triggering condition, a second charging current value for charging the terminal as the target maximum current value.

\* \* \* \* \*